US011368883B2

(12) United States Patent
Moosavi et al.

(10) Patent No.: US 11,368,883 B2
(45) Date of Patent: Jun. 21, 2022

(54) CELL GLOBAL IDENTITY REPORTING

(71) Applicant: Telefonaktiebolaget LM Ericsson (publ), Stockholm (SE)

(72) Inventors: Reza Moosavi, Linköping (SE); Icaro L. J. da Silva, Solna (SE); Pradeepa Ramachandra, Linköping (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/048,064

(22) PCT Filed: Apr. 17, 2019

(86) PCT No.: PCT/EP2019/059971
§ 371 (c)(1),
(2) Date: Oct. 15, 2020

(87) PCT Pub. No.: WO2019/202020
PCT Pub. Date: Oct. 24, 2019

(65) Prior Publication Data
US 2021/0153083 A1 May 20, 2021

Related U.S. Application Data

(60) Provisional application No. 62/659,054, filed on Apr. 17, 2018.

(51) Int. Cl.
*H04W 48/10* (2009.01)
*H04W 36/00* (2009.01)
*H04W 24/10* (2009.01)

(52) U.S. Cl.
CPC ....... *H04W 36/0061* (2013.01); *H04W 24/10* (2013.01); *H04W 36/0088* (2013.01); *H04W 36/00835* (2018.08); *H04W 48/10* (2013.01)

(58) Field of Classification Search
CPC ........ H04W 36/0061; H04W 36/0835; H04W 36/0088; H04W 24/10; H04W 48/10
See application file for complete search history.

(56) References Cited

U.S. PATENT DOCUMENTS

2016/0198340 A1 7/2016 Joung et al.
2018/0139666 A1* 5/2018 Ahmavaara ....... H04W 36/0094
(Continued)

FOREIGN PATENT DOCUMENTS

WO    WO 2019137227 A1    7/2019

OTHER PUBLICATIONS

Vivo, "ANR for EN-DC and NR Standalone", Apr. 16-17, 2017, 3GPP TSG-RAN WG2 Meeting#101bis, Sanya China, R2-1804595, 5 pages. (Year: 2017).*

(Continued)

*Primary Examiner* — Barry W Taylor
(74) *Attorney, Agent, or Firm* — Sage Patent Group

(57) ABSTRACT

The invention refers to a wireless device and to operating the wireless terminal, UE, connected to a serving network node associated to a serving cell of a radio access network, RAN, the method comprising: receiving system information from a neighbour cell of the serving cell, determining from the system information if the neighbour cell does or does not broadcast a global cell identifier, CGI, of the neighbour cell; and if the neighbour cell does not broadcast the CGI, transmitting a global cell identifier, CGI, report to the serving network node, wherein the CGI report includes an indication that the neighbour cell does not broadcast the CGI of the neighbour cell. The invention further refers to a corresponding network node and to a method performed in the network node.

18 Claims, 10 Drawing Sheets

(56) References Cited

U.S. PATENT DOCUMENTS

| | | | |
|---|---|---|---|
| 2019/0223163 A1* | 7/2019 | Ko | H04L 27/26 |
| 2019/0281514 A1* | 9/2019 | Krishnan | H04W 36/0083 |
| 2019/0364451 A1* | 11/2019 | Yang | H04W 24/10 |
| 2020/0336955 A1 | 10/2020 | Bao et al. | |
| 2020/0359282 A1* | 11/2020 | da Silva | H04W 36/0058 |
| 2021/0195663 A1* | 6/2021 | da Silva | H04W 36/0061 |

OTHER PUBLICATIONS

International Search Report and Written Opinion of the International Searching Authority, PCT/EP2019/059971, dated Jun. 19, 2019, 15 pages.

Huawei et al: "Automatic Neighbour Relation in NR", 3GPP Draft R2-1806182, Apr. 16, 2018 (Apr. 16, 2018), 2 pages.

Ericsson: "ANR for NSA NR", 3GPP Draft R2-1704108, May 6, 2017 (May 6, 2017), XP51264276A, 5 pages.

LG Electronics Inc: "ANR for NR", 3GPP Draft R2-1802692, Feb. 14, 2018 (Feb. 14, 2018), XP51399296A, 2 pages.

Huawei et al: "ASN.1 handling of SA specific fields in NSA", 3GPP Draft R2-1712541, Nov. 16, 2017 (Nov. 16, 2017), XP51371152A, 6 pages.

Japanese Notice of Reasons for Rejection prepared dated Dec. 20, 2021 for Japanese Patent Application No. 2020-557194, 8 pages (including English translation).

Vivo, 3GPP TSG-RAN WG2 Meeting #99, R2-1708422, Remaining issues on minimum system information content, Berlin, Germany, Aug. 21-25, 2017, 4 pages.

* cited by examiner

Option 1

Option 2

Option 3/3A/3X

Figure 2

Table 1- Network NW Actions Upon Receiving CGI Report

| SIB1present | CGI Info | NW Actions |
|---|---|---|
| 1 | Non-empty | eNB/gNB uses the CGI info to build ANR table. |
| 1 | Empty | eNB/gNB instructs more UEs to perform CGI reporting. |
| 0 | Empty | eNB/gNB reports this to a third NW node. |
| 0 | Non-empty | Error case, as this case cannot happen. |

Figure 3

Table 2- Network NW Actions Upon Receiving Enhanced CGI Report

| Combined SA/NSA Indicator with SIB1 presence/absence | CGI Info | NW Actions |
|---|---|---|
| 1 | Non-empty | eNB/gNB uses the CGI info to build ANR table, also stores the info that the cell is SA. |
| 0 | Non-empty | eNB/gNB uses the CGI info to build ANR table, also stores the info that the cell is NSA. |
| 1 | Empty | eNB/gNB instructs more UEs to perform CGI reporting. |
| 0 | Empty | eNB/gNB reports this to a third NW node. |

CELL GLOBAL IDENTITY REPORTING

CROSS REFERENCE TO RELATED APPLICATIONS

This application is a 35 U.S.C. § 371 national stage application of PCT International Application No. PCT/EP2019/059971 filed on Apr. 17, 2019, which in turns claims domestic priority to U.S. Provisional Patent Application No. 62/659,054, filed on Apr. 17, 2018, the disclosures and content of which are incorporated by reference herein in their entirety.

TECHNICAL FIELD

The present disclosure relates generally to wireless communications and related wireless devices and network nodes and more specifically to Cell Global Identity, CGI, reporting.

BACKGROUND

Since the first release of Long Term Evolution, LTE, automatic neighbour relation (ANR) functionality has been introduced to automatically generate the relations between base stations, eNBs. Such relations are used to establish connections between base stations support mobility, load balancing, dual connectivity, etc., and hence, ANR may reduce planning and operation costs for operators.

In LTE, a user equipment (UE), also referred to as a wireless device, detects cells based on their primary/secondary synchronization signals (PSS/SSS), which encode a physical cell identifier or physical cell identity (PC). The PCI may not be unique across the entire network; there are 504 different PCIs available in LTE. A property of these signals is that the UE may autonomously detect a neighbour cell ID from an acquired PSS/SSS, so that the network does not need to provide a neighbour cell list to a UE. A UE may typically detect and measure neighbour cells by sampling a short time window (e.g., 5 ms) on the target frequency (which may be the same or different from a frequency of a serving cell) and search (possibly offline) for PSS/SSS occurrences within that sample. For each detected PSS/SSS, the UE can also perform a measurement using the cell reference signal (CRS) corresponding to the PCI. The result of that action is a list of neighbour cell identities and corresponding measurement samples.

Once the UE performs measurements, mobility events can trigger the transmission of measurement reports. Based on these reports, the serving base station is able to identify that a given PCI belongs to a neighbour base station in order to trigger a handover preparation procedure. In order to do that, the serving base station may need to maintain a neighbour relation table (NRT) that maps locally unique identifiers (i.e. the PCIs in LTE) with globally unique identifiers (or identities), e.g. the E-UTRAN cell global identifier (or identity), E-CGI. E-CGI is defined in LTE as a combination of PLMN (Public Land Mobile Network) ID (e.g., a combination of country code and network code) and enhanced cell identity ECI (combination of eNB ID and cell ID).

A neighbour relation from a source cell to a target cell means that a base station controlling the source cell knows the ECG/CGI and PCI of the target cell and has an entry in the NRT for the source cell identifying the target cell.

Given the benefits of ANR in LTE, ANR may continue to be an important feature in next generation radio systems, denoted by NR or 5G. The challenging NR requirements may be expected to result in an even higher emphasis on seamless mobility than in legacy radio access technologies (RATs), which may further increase importance of automatic relation establishment in NR.

In certain scenarios, however, the UE might not be able to detect the CGI of an (unknown) neighbour cell e.g. due to bad radio conditions. Different to LTE, where the UE may send a CGI report with an empty CGI info field in order to let the network know that the UE was not able to detect the CGI of the unknown cell, such mechanisms might fail in NR, as in NR the SIB1 can be absent, and thus, instructing more UEs to report CGI would not help. In such circumstance, the network would not know if any failed CGI reporting is due to the absence of SIB1 or not, and hence would not know if it should instruct further UEs to perform CGI reporting (e.g. such that the serving base station can update its NRT).

SUMMARY

It is an object of the present invention to improve the handling of CGI reporting.

This object is achieved by the independent claims. Advantageous embodiments are described in the dependent claims and by the following description.

According to some embodiments, a method is provided to operate a wireless terminal or UE that is connected to a serving network node, wherein the serving network node is associated to a serving cell of a radio access RAN, the method comprising:

receiving system information (e.g. a master information block MIB) of a neighbour cell of the serving cell,
determining from the system information if the neighbour cell does or does not broadcast a global cell identifier, CGI, of the neighbour cell, e.g. if system information block 1, SIB1, is present (broadcasted) or absent (not broadcasted); and
if the neighbour cell does not broadcast the CGI (if SIB1 is absent), transmitting a global cell identifier, CGI, report to the serving network node,
wherein the CGI report includes an indication that the neighbour cell does not broadcast the CGI of the neighbour cell.

According to some embodiments, a method is provided to operate a wireless terminal or UE that is connected to a serving network node, wherein the serving network node is associated to a serving cell of a radio access RAN, the method comprising: comprising
receiving a request from the serving network node to report the CGI of the neighbour cell,
receiving system information (e.g. a master information block MIB) of a neighbour cell of the serving cell,
determining from the system information if the neighbour cell does or does not broadcast a global cell identifier, CGI, of the neighbour cell, e.g. if system information block 1, SIB1, is present (broadcasted) or absent (not broadcasted);
starting a timer (e.g. a T321 timer) responsive to (and/or after) receiving the request to report the CGI; and
transmitting a CGI report to the serving network node,
wherein transmitting the CGI report is performed before expiration of the timer after (and/or responsive to) detecting that the neighbour cell does not broadcast the cell identifier of the neighbour cell. The timer may be stopped upon (and/or before) transmitting the CGI report (otherwise the UE may continue to try to get the CGI until the timer expires).

According to some embodiments, a method of operating a base station or gNB of a radio access network, RAN, the method comprising receiving a cell identifier report from a wireless device, wherein the cell identifier report includes an indication that the neighbour cell does not broadcast the global cell identifier, CGI, of the neighbour cell. The method may further comprise determining from this information if the indication is due to the absence of CGI broadcasting or if is due to the wireless device not being able to detect the CGI of the neighbour cell properly. According to some embodiments a UE is provided that performs the steps of:

receiving system information (e.g. a master information block MIB) of a neighbour cell of the serving cell,
    determining from the system information if the neighbour cell does or does not broadcast a global cell identifier, CGI, of the neighbour cell, e.g. if system information block 1, SIB1, is present (broadcasted) or absent (not broadcasted); and
    if the neighbour cell does not broadcast the CGI (if SIB1 is absent), transmitting a global cell identifier, CGI, report to the serving network node,
    wherein the CGI report includes an indication that the neighbour cell does not broadcast the CGI of the neighbour cell.

According to some embodiments a UE is provided that performs the steps of:

receiving a request from the serving network node to report the CGI of the neighbour cell,
    receiving system information (e.g. a master information block MIB) of a neighbour cell of the serving cell,
    determining from the system information if the neighbour cell does or does not broadcast a global cell identifier, CGI, of the neighbour cell, e.g. if system information block 1, SIB1, is present (broadcasted) or absent (not broadcasted);
    starting a timer (e.g. a T321 timer) responsive to (and/or after) receiving the request to report the CGI; and
    transmitting a CGI report to the serving network node,
    wherein transmitting the CGI report is performed before expiration of the timer after (and/or responsive to) detecting that the neighbour cell does not broadcast the cell identifier of the neighbour cell. The timer may be stopped upon (and/or before) transmitting the CGI report.

According to some embodiments, a base station of gNB is provided that performs the step of receiving a cell identifier report from a wireless device, wherein the cell identifier report includes an indication that the neighbour cell does not broadcast the global cell identifier, CGI, of the neighbour cell. The base station may determine from this information if the indication is due to the absence of CGI broadcasting or if is due to the wireless device not being able to detect the CGI of the neighbour cell properly.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 2 is a Table illustrating operations of a base station upon receiving a CGI report according to some embodiments of inventive concepts;

FIG. 3 is a Table illustrating operations of a base station upon receiving a CGI report according to some other embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4:
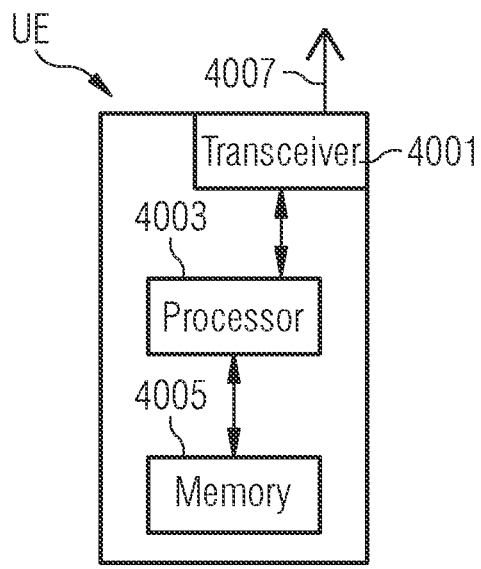
FIG. 4 is a block diagram illustrating a wireless device or UE according to some embodiments of inventive concepts.

FIG. 4 is a block diagram illustrating elements of a UE (also referred to as a wireless terminal, a wireless (communication) device, a wireless communication terminal, user equipment, a user equipment node/terminal/device) configured to provide wireless communication according to embodiments of inventive concepts. As shown, UE may include an antenna 4007, and a transceiver circuit 4001 (also referred to as a transceiver) including a transmitter and a receiver configured to provide uplink and downlink radio communications with a base station eNB of a wireless communication network (also referred to as a radio access network RAN). The UE may also include a processor circuit 4003 (also referred to as a processor) coupled to the transceiver circuit, and a memory circuit 4005 (also referred to as memory) coupled to the processor circuit. The memory circuit 4005 may include computer readable program code that when executed by the processor circuit 4003 causes the processor circuit to perform operations according to embodiments disclosed herein. According to other embodiments, processor circuit 4003 may be defined to include memory so that a separate memory circuit is not required. The UE may also include an interface (such as a user interface) coupled with processor 4003, and/or UE may be an IoT and/or MTC device.

As discussed herein, operations of the UE may be performed by processor 4003 and/or transceiver 4001. For example, processor 4003 may control transceiver 4001 to transmit uplink communications through transceiver 4001 over a radio interface to a base station eNB of a wireless communication network and/or to receive downlink communications through transceiver 4001 from a base station eNB of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

Figure 5:
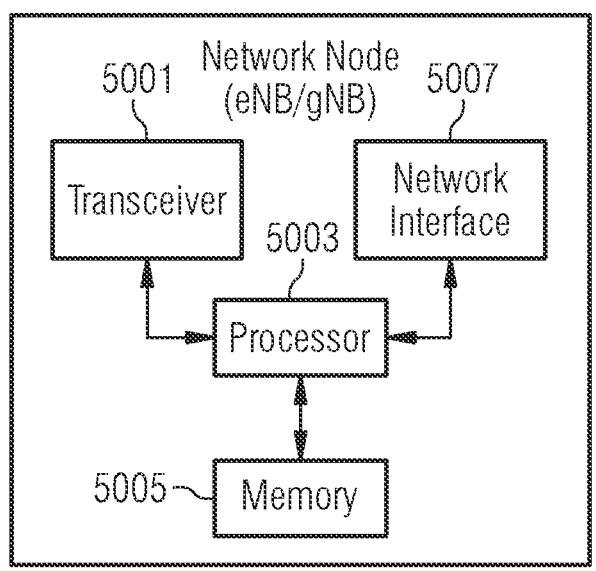
FIG. 5 is a block diagram illustrating a network node eNB/gNB according to some embodiments of inventive concepts.

FIG. 5 is a block diagram illustrating elements of a node (also referred to as a network node, base station, eNB, eNodeB, etc.) of a wireless communication network (also referred to as a Radio Access Network RAN) configured to provide cellular communication according to embodiments of inventive concepts. As shown, the network node may include a transceiver circuit 5001 (also referred to as a transceiver) including a transmitter and a receiver configured to provide uplink and downlink radio communications with wireless devices. The network node may include a network interface circuit 5007 (also referred to as a network interface) configured to provide communications with other nodes (e.g., with other base stations and/or core network nodes) of the RAN. The network node may also include a processor circuit 5003 (also referred to as a processor) coupled to the transceiver circuit, and a memory circuit 5005 (also referred to as memory) coupled to the processor circuit. The memory circuit 5005 may include computer readable program code that when executed by the processor circuit 5003 causes the processor circuit to perform operations according to embodiments disclosed herein. According to other embodiments, processor circuit 5003 may be defined to include memory so that a separate memory circuit is not required.

As discussed herein, operations of the network node may be performed by processor 5003, network interface 5007, and/or transceiver 5001. For example, processor 5003 may control transceiver 5001 to transmit downlink communications through transceiver 5001 over a radio interface to one or more UEs and/or to receive uplink communications through transceiver 5001 from one or more UEs over a radio interface. Similarly, processor 5003 may control network interface 5007 to transmit communications through network interface 5007 to one or more other network nodes and/or to receive communications through network interface from one or more other network nodes. Moreover, modules may be stored in memory 5005, and these modules may provide instructions so that when instructions of a module are executed by processor 5003, processor 5003 performs respective operations (e.g., operations discussed below with respect to Example Embodiments).

As discussed above, CGI reporting is part of ANR functionality, where the UE is requested to read a neighbour cell's system information (including global cell identity) to assist a base station eNB/gNB to build neighbour relation information. CGI measurement may be requested when the UE has reported an unknown PCI (i.e., an unknown neighbour cell). PCI information may be included in all the UE measurement reports which may have been initiated for different purposes. When the base station eNB/gNB has required information about a neighbour cell, this information is stored, and it is used to setup X2/Xn connection (network interface connections) between the nodes, which as discussed above may be used for several different procedures, such as handover, dual connectivity setup, etc.

In LTE, the UE upon receiving a measurement configuration including a reportConfig with the purpose set to reportCGI, starts a timer denoted by T321 and tries to acquire CGI info of the requested cell. If the UE succeeds within the duration of the timer, it includes CGI info in the reportCGI message and sends it to network (NW). On the other hand, if the UE fails to detect the CGI info within the duration of T321, it sends reportCGI message with an empty CGI info field.

Figure 1A:
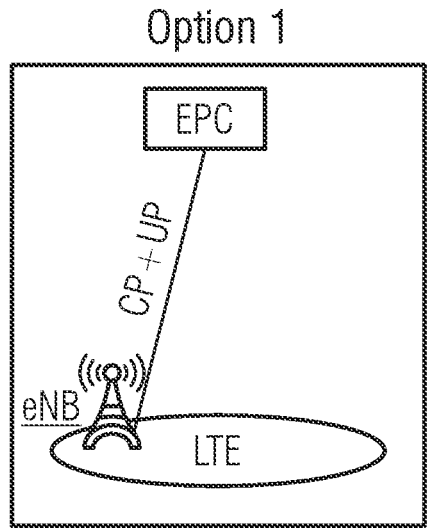
FIGS. 1A-E illustrate examples of LTE and NR interworking.
Figure 1B:
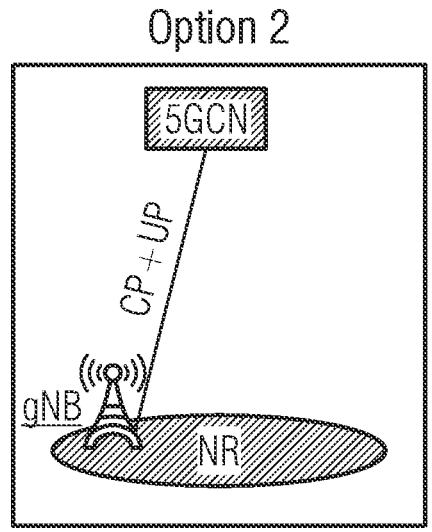
Figure 1C:
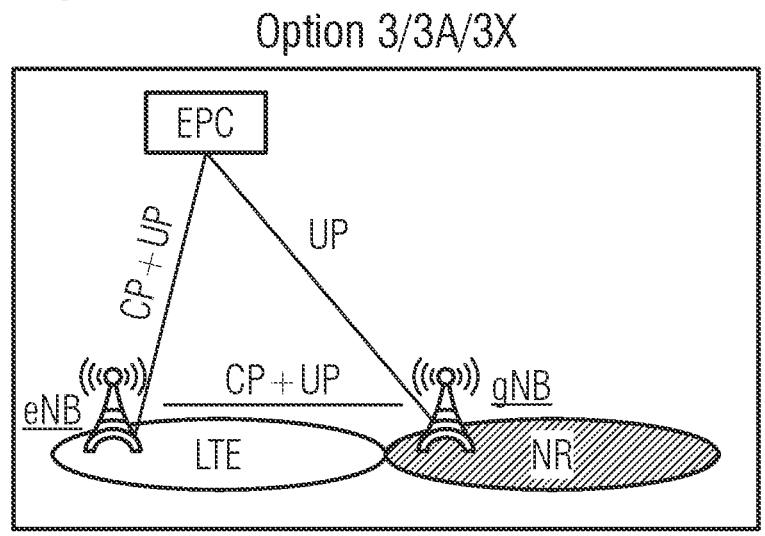
Figure 1D:
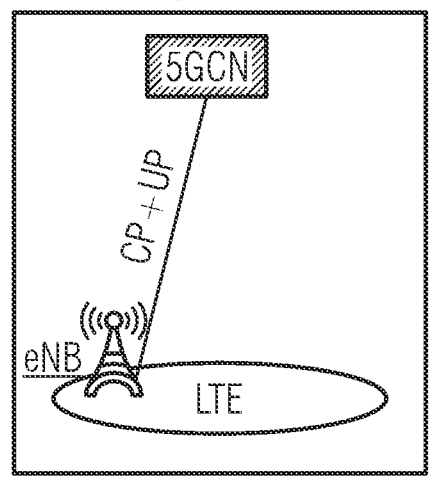
Figure 1E:
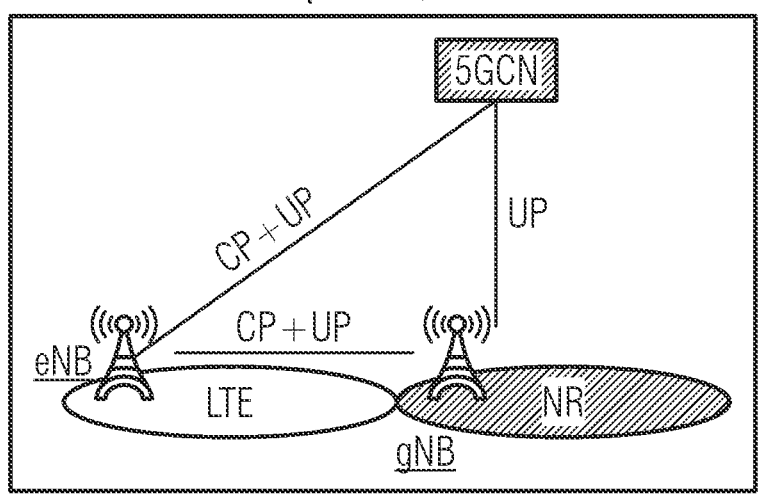

There are different ways to deploy a 5G network with or without interworking with existing LTE and evolved packet core (EPC). Some of these options are illustrated in FIGS. 1A-E. FIG. 1C, the first version to be supported is referred to as "option 3" which is referred to as EN-DC (EUTRAN-NR Dual Connectivity). In such a deployment, dual connectivity between NR and LTE is applied where an LTE base station eNB is a master node and an NR base station gNB is secondary node. The RAN node (gNB) supporting NR, may not have a control plane connection to core network (EPC), and instead, it may rely on the LTE node eNB as master node (MeNB). This is also referred to as non-standalone (NSA) NR, and there may be no 5GCN in this deployment. In this case, the functionality of an NR cell may be limited to be used for connected mode UEs as a booster and/or diversity leg, but a UE may not camp on these NR cells.

With introduction of a 5G core network (5GCN), other options may be also valid. For example, option 2 for FIG. 1B may support stand-alone (SA) NR deployment where a 5G base station gNB is connected to 5GCN. Similarly, an LTE base station eNB can also be connected to 5GCN using option 5 of FIG. 1D. In these cases, both NR and LTE may be seen as part of the NG-RAN which are connected to 5GCN.

System information is divided into the master information block (MIB) and a number of system information blocks (SIBs). The MIB may include a limited number of most essential and/or most frequently transmitted parameters that are used to acquire other information from the cell, and the MIB is transmitted on BCH (Broadcast Channel).

In particular, the information used/needed for ANR, namely CGI, TAC (Tracking Area Code), and PLMN list may be broadcast in system information block type 1 (SIB1). As NR can be deployed alongside with LTE (more precisely as EN-DC described above), there is the possibility for an NR cell to skip SIB1 transmissions. To help wireless devices UEs to realize the absence of SIB1 transmission, an indication regarding SIB1 may be broadcast in MIB. The pdcch-ConfigSIB1 information element (IE) in MIB1 may be made mandatory and one code-point (e.g. all-zeros) as "SIB1 not present" may be assigned. This way, the UE by decoding MIB content, can know if SIB1 will be transmitted or not.

In certain scenarios, the UE might not be able to detect the CGI for an unknown cell due to, for example, a bad radio condition. In such cases in LTE, the UE sends a CGI report with empty CGI info field, as described above. This way, the NW would know that the UE was not able to detect the CGI of the unknown cell. In this case, the NW can instruct more wireless devices UEs to perform CGI reporting for the unknown cell, in order to finalize the ANR procedures.

In NR, on the other hand, such mechanisms might fail, as in NR the SIB1 can be absent and hence sending more requests to wireless devices UEs for CGI reporting would not help. With current reporting structures, there may not be any possibility for the network NW to know if any failed CGI reporting is due to the absence of SIB1 or not. Accordingly, the network NW may not know if it should send more requests for more wireless devices UEs to perform CGI reporting for an unknown PCI.

According to some embodiments of inventive concepts, a UE may respond to a serving base station with information about the presence or absence of SIB1 when responding to a request for CGI reporting.

On the UE side, this means that the UE may receive (or read) information about the presence/absence of SIB1 from a neighbour cell MIB broadcast channel, and later report this information to the serving cell. The network node responsible for the serving cell can then use this information to know if any failed CGI reporting is due to the absence of SIB1 or due to the UE not being able to detect the CGI of the neighbour cell properly.

According to some UE related embodiments of inventive concepts, the information about the presence/absence of SIB1 from the neighbour cell may be realized using an enhanced CGI reporting where the UE is provided by the network with a (local) NR cell identifier (e.g., a physical cell identifier PCI), based on that it first acquires if the cell is broadcasting SIB1 or not. If the neighbour cell broadcasts SIB1, the UE acquires system information associated with that NR cell identifier. Once that is done, the UE includes that information in a measurement report and sends the measurement report to the serving node.

According to some network related embodiments of inventive concepts, the reported information is received by the serving base station from the UE about a reported NR cell(s), and the serving base station can decide what actions to take upon a CGI reporting failure. For example, if the failure is due to the absence of SIB1, the serving base station can report this to a third network node (for instance to an Operation and Management, OAM, entity to instruct all cells to broadcast SIB1 for a while), and if the failure is not due to the absence of SIB1 (the UE has not been able to detect CGI), the serving base station can instruct more UEs to perform CGI reporting for the unknown cell.

According to some embodiments of inventive concepts, improved ANR operation may be provided. The information about the presence/absence of SIB1 can be used by the NW to trigger more appropriate actions in case of CGI reporting failure. As mentioned above, in the event that the failed CGI report is not due to the absence of SIB1, the NW can send requests for more wireless devices UEs to perform CGI reporting, and in the event that the failed CGI reporting is due to the absence of SIB1, the NW can take actions such as instructing all cells or cells within a geographical area to transmit SIB1 to aid ANR procedures. Moreover, end user performance may be improved. The UE, upon realizing that SIB1 is absent after decoding MIB, can send this information along with empty CGI info in the CGI report without waiting for expiration of a timer (e.g., expiration of the T321 timer).

CGI reporting may be a part of ANR operation, where the UE is requested to read system information of neighbour cells (e.g., including cell global identity) to assist a base station eNB/gNB building neighbour relation information. CGI measurement may be requested when the UE has reported an unknown PCI (an unknown neighbour cell). PCI information may be included in all the UE measurement reports which may have been initiated for different purposes. When the base station eNB/gNB has required information about a neighbour cell, this information may be stored and/or used to setup X2/Xn connection between the nodes (base stations), and this information may be used for different procedures, such as handover, dual connectivity setup, etc.

In some embodiments, the UE may be configured with an NR measurement (this is an inter-RAT measurement, if the UE is connected to an LTE base station eNB, and otherwise an intra-NR measurement, if the UE is connected to a 5G base station gNB).

When the UE reports a neighbour NR cell's PCI which is not known in the serving eNB/gNB's NRT, a NR Cell Global Identity, NCGI, measurement may be requested by the network.

According to some embodiments, the NCGI measurement report may be indicate of whether SIB1 has been present or not.

Based on the information of whether SIB1 is present or absent, the base station eNB/gNB may determine what actions to take in case if the CGI reporting fails (e.g. if it receives a CGI report with empty CGI field:
  If the failed CGI reporting is due to the absence of SIB1 from the neighbour cell, the base station can report this to a third NW node, for example an OAM, for further actions such as instructing all cells in a certain geographical area to transmit SIB1 for some time.
  If the failed CGI reporting is not due to the absence of SIB1 from the neighbour cell, the base station can instruct more wireless devices UEs to perform CGI reporting for the neighbour cell.

There are different ways to indicate the presence of SIB1 in the CGI report from the UE.

According to some embodiments, an additional bit (or flag), denoted as "SIB1 present" in this document for illustration, can be defined in the CGI report reportCGI. In this case, setting this bit (flag) to 1 (true) indicates the presence of SIB1, and setting this bit (flag) to 0 (false) indicates that the SIB1 is not present. Table 1 summarizes the NW actions upon receiving the enhanced CGI report from the UE. As shown in Table 1 of FIG. 2 (illustrating NW actions upon receiving a CGI report):
  If the "SIB1 present" flag is true (=1) and the "CGI Info" is non-empty, the serving base station eNB/gNB uses the CGI information to determine the ANR (build the ANR table);
  If the "SIB1 present" flag is true (=1) and the "CGI Info" is empty, the serving base station instructs one or more other wireless devices to perform CGI reporting;
  If the "SIB1 present" flag is false (=0) and the "CGI Info" is empty, the serving base station reports this occurrence to another NW node.
  The "SIB1 present" flag being false (=0) and the "CGI Info" being empty, may be regarded as an error, as such combination may not happen.

In recent discussions, applicant proposed to add an SA/NSA (Stand-Alone/Non-Stand-Alone) indicator in reportCGI to indicate if the reported cell is stand-alone or non-stand-alone. SA mode of operation may refer to a gNB having a control plane connection to a core network, CN; NSA mode of operation may refer to a gNB not having a control plane connection to the CN and instead may rely on the serving network node as master node. In SA (mode of) operation, the NW base station may need to always transmit SIB1, and the SA/NSA indicator can thus be used to also report the presence of SIB1 (multi-purpose). According to some embodiments, the information about the presence/ absence of SIB1 can be encoded implicitly using an SA/NSA indicator in reportCGI (if present), as illustrated in Table 2 of FIG. 3:

If the combined SA/NSA-CGI presence/absence indicator flag is set to true (=1) and the CGI Info is non-empty, the base station eNB/gNB uses the CGI info to determine the ANR (build the ANR table), and may also store the info that the cell is SA;

If the combined SA/NSA-CGI presence/absence indicator flag is set to false (=0) and the CGI Info is non-empty, the base station eNB/gNB uses the CGI info to determine ANR (build the ANR table) and may also store the info that the cell is NSA;

If the combined SA/NSA-CGI presence/absence indicator flag is set to true (=1) and the CGI Info is empty, the base station eNB/gNB instructs at least one other UE to perform CGI reporting; and If the combined SA/NSA-CGI presence/absence indicator flag is set to false (=0) and the CGI Info is empty, the base station eNB/gNB reports this event to another NW node.

In embodiments, the UE upon decoding the MIB and realizing that the SIB1 is absent, does not wait for expiration of the measurement timer (e.g., a T321 timer). In this case, the UE may stop the measurement (T321) timer and send the CGI report with empty CGI info. The UE indicates to the serving eNB/gNB base station the absence of SIB1 using any of the embodiments described above.

Operations of a UE will now be discussed with reference to the flow chart of FIG. 6 according to some embodiments of inventive concepts. For example, modules may be stored in wireless terminal memory 4005 of FIG. 4, and these modules may provide instructions so that when the instructions of a module are executed by wireless device processor 4003, processor 4003 performs respective operations of the flow chart of FIG. 6.

In essence, receiving (611, 613) system information from a neighbour cell, wherein the system information includes a first indication that the neighbour cell does not broadcast the cell identifier of the neighbour cell, and transmitting (615) a cell identifier report to the RAN, wherein the cell identifier report includes a second indication that the neighbour cell does not broadcast the cell identifier of the neighbour cell.

Figure 6:
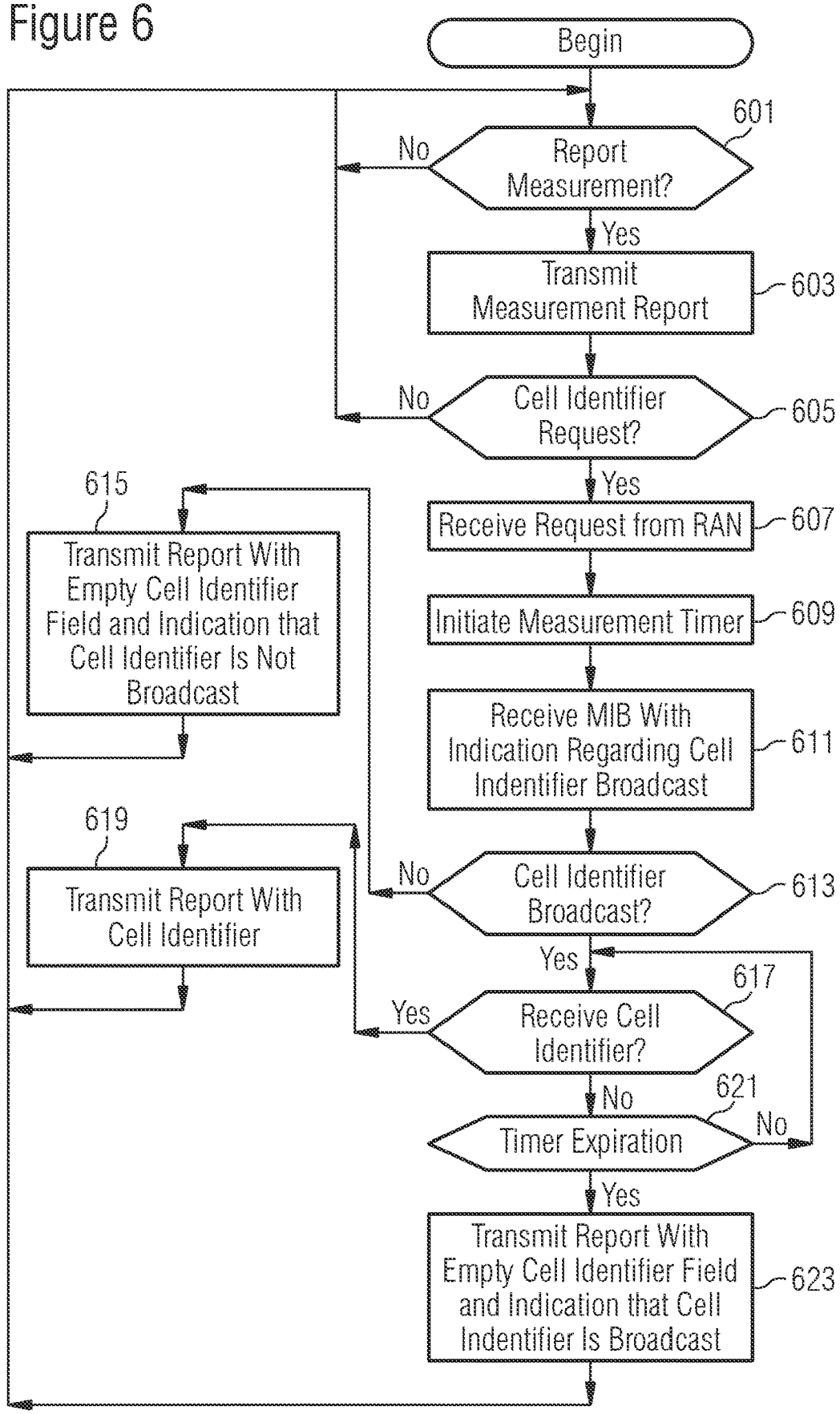
FIG. 6 is a flow chart illustrating operations of a wireless device according to some embodiments of inventive concepts.

FIG. 6 illustrates operations of a UE in a radio access network RAN. At block 601, processor 4003 may determine when to transmit a measurement report to a serving base station eNB/gNB of the RAN. Responsive to determining to transmit a measurement report, processor may transmit a measurement report through transceiver 4001 to the serving base station eNB/gNB of the RAN at block 603, with the measurement report including a physical cell identifier PCI for a neighbour cell. The PCI, for example, may be encoded in a synchronization signal transmitted by the neighbour cell.

At block 605, processor 4003 may determine if a cell identifier request (e.g., a request for a cell global identifier CGI) is received from the serving base station. The serving base station, for example, may transmit a cell identifier request if the PCI and/or a corresponding CGI for the neighbour cell is not included in a neighbour relations table NRT for the serving base station. Otherwise, the serving base station may not transmit a cell identifier request responsive to the measurement report. If a cell identifier request is transmitted, processor may receive a request from the serving base station of the RAN (through transceiver 4001) to report a cell identifier of the neighbour cell at block 607, and the request may include the PCI for the neighbour cell.

Responsive to receiving the request from the serving base station, processor 4003 may initiate a measurement timer (e.g., a T321 timer) at block 609 and receive system information from the neighbour cell through transceiver 4001 at block 611. The system information of block 611 may include a master information block MIB with an indication that the neighbour cell does not include a system information block having the cell identifier of the neighbour cell in the system information that is broadcast. For example, the indication that the neighbour cell does not include a system information block having the cell identifier may be provided in a physical downlink control channel PDCCH ConfigSIB1 information element IE of the MIB.

Responsive to the system information including an indication that the neighbour cell does not broadcast the cell identifier of the neighbour cell at block 613, processor 4003 may transmit a cell identifier report through transceiver 4001 to the serving base station at block 615, with the cell identifier report including an empty cell identifier field and with an indication that the neighbour cell does not broadcast the cell identifier of the neighbour cell. Moreover, the cell identifier report of block 615 may be transmitted before expiration of the measurement timer responsive to receiving the system information including the indication that the neighbour cell does not broadcast the cell identifier of the neighbour cell at block 613.

Operations discussed above with respect to blocks 601, 603, 605, 607, 609, 611, 613, and 615 may thus be performed when a neighbour cell transmits an indication that a cell identifier is not broadcast. Operations when a neighbour cell transmits an indication that a cell identifier is broadcast but the cell identifier is not received are discussed below.

At block 601, processor 4003 may determine when to transmit another measurement report to a current serving base station eNB/gNB of the RAN (e.g., a same serving base station discussed above or a different serving base station). Responsive to determining to transmit another measurement report, processor 4003 may transmit a measurement report through transceiver 4001 to the current serving base station eNB/gNB of the RAN at block 603, with the measurement report including a physical cell identifier PCI for a second neighbour cell. The PCI, for example, may be encoded in a synchronization signal transmitted by the second neighbour cell.

At block 605, processor 4003 may determine if a cell identifier request of the second neighbour cell (e.g., a request for a cell global identifier CGI) is received from the current serving base station. The current serving base station, for example, may transmit a cell identifier request if the PCI and/or a corresponding CGI for the second neighbour cell is not included in a neighbour relations table NRT for the current serving base station. Otherwise, the current serving base station may not transmit a cell identifier request responsive to the measurement report. If a cell identifier request is transmitted, processor 4003 may receive a request from the current serving base station of the RAN (through transceiver 4001) to report a cell identifier of the second neighbour cell at block 607, and the request may include the PCI for the second neighbour cell.

Responsive to receiving the request from the current serving base station, processor 4003 may initiate the measurement timer (e.g., a T321 timer) at block 609 and receive system information from the second neighbour cell through transceiver 4001 at block 611. The system information of block 611 from the second neighbour cell may include a master information block MIB with an indication that the second neighbour cell does include a system information block having the cell identifier of the second neighbour cell in the system information that is broadcast. For example, the indication that the second neighbour cell does include a system information block having the cell identifier may be provided in a physical downlink control channel PDCCH ConfigSIB1 information element IE of the MIB broadcast by the second neighbour cell.

Responsive to the system information including an indication that the neighbour cell does broadcast the cell identifier of the neighbour cell at block 613 and responsive to expiration of the measurement timer without receiving the cell identifier of the second neighbour cell at blocks 617 and 621, processor 4003 may transmit a cell identifier report for the second neighbour cell through transceiver 4001 to the current serving base station at block 623. More particularly, the cell identifier report of block 623 may include an empty cell identifier information field and an indication that the second neighbour cell does broadcast the cell identifier of the second neighbour cell.

Operations discussed above with respect to blocks 601, 603, 605, 607, 609, 611, 613, 617, 621, and 623 may thus be performed when a neighbour cell transmits an indication that a cell identifier is broadcast but a cell identifier is not received. Operations when a cell identifier is received from a neighbour cell are discussed below.

At block 601, processor 4003 may determine when to transmit another measurement report to a current serving base station eNB/gNB of the RAN (e.g., a same serving base station discussed above or a different serving base station). Responsive to determining to transmit another measurement report, processor 4003 may transmit a measurement report through transceiver 4001 to the current serving base station eNB/gNB of the RAN at block 603, with the measurement report including a physical cell identifier PCI for a third neighbour cell. The PCI, for example, may be encoded in a synchronization signal transmitted by the third neighbour cell.

At block 605, processor 4003 may determine if a cell identifier request of the third neighbour cell (e.g., a request for a cell global identifier CGI) is received from the current serving base station. The current serving base station, for example, may transmit a cell identifier request if the PCI and/or a corresponding CGI for the third neighbour cell is not included in a neighbour relations table NRT for the current serving base station. Otherwise, the current serving base station may not transmit a cell identifier request responsive to the measurement report. If a cell identifier request is transmitted, processor 4003 may receive a request from the current serving base station of the RAN (through transceiver 4001) to report a cell identifier of the third neighbour cell at block 607, and the request may include the PCI for the third neighbour cell.

Responsive to receiving the request from the current serving base station, processor 4003 may initiate the measurement timer (e.g., a T321 timer) at block 609 and receive system information from the third neighbour cell through transceiver 4001 at block 611. The system information of block 611 from the third neighbour cell may include a master information block MIB with an indication that the third neighbour cell does include a system information block having the cell identifier of the third neighbour cell in the system information that is broadcast. For example, the indication that the third neighbour cell does include a system information block having the cell identifier may be provided in a physical downlink control channel PDCCH ConfigSIB1 information element IE of the MIB broadcast by the third neighbour cell.

At block 617, processor 4003 may receive (through transceiver 4001) system information including the cell identifier for the third neighbour cell before expiration of the measurement timer at block 621, and at block 619, processor 4003 may transmit a cell identifier report through transceiver 4001 to the current serving base station, with the cell identifier report including the cell identifier of the third neighbour cell and a stand-alone/non-stand-alone indicator for the third neighbour cell. The same field (e.g., bit) of a cell identifier report may thus be used to indicate that a cell identifier is or is not broadcast when an empty cell identifier field is provided in cell identifier reports of blocks 615 and/or 623, or to indicate that a neighbour cell is stand-alone/non-stand-alone when a cell identifier is provided in cell identifier reports of block 619.

According to some other embodiments, separate fields (e.g., separate bits) of a cell identifier report may be used to communicate indications that a cell identifier is or is not broadcast and to communicate stand-alone/non-stand-alone status.

Various operations from the flow chart of FIG. 6 may be optional with respect to some embodiments of wireless devices and related methods. Regarding methods of example embodiment 1 (set forth below), for example, operations of blocks 601, 603, 605, 609, 617, 619, 621, and 623 of FIG. 6 may be optional.

Operations of a base station eNB will now be discussed with reference to the flow chart of FIG. 7. For example, modules may be stored in base station memory 5005 of FIG. 5, and these modules may provide instructions so that when the instructions of a module are executed by processor 5003, processor 5003 performs respective operations of the flow chart of FIG. 5.

Figure 7:
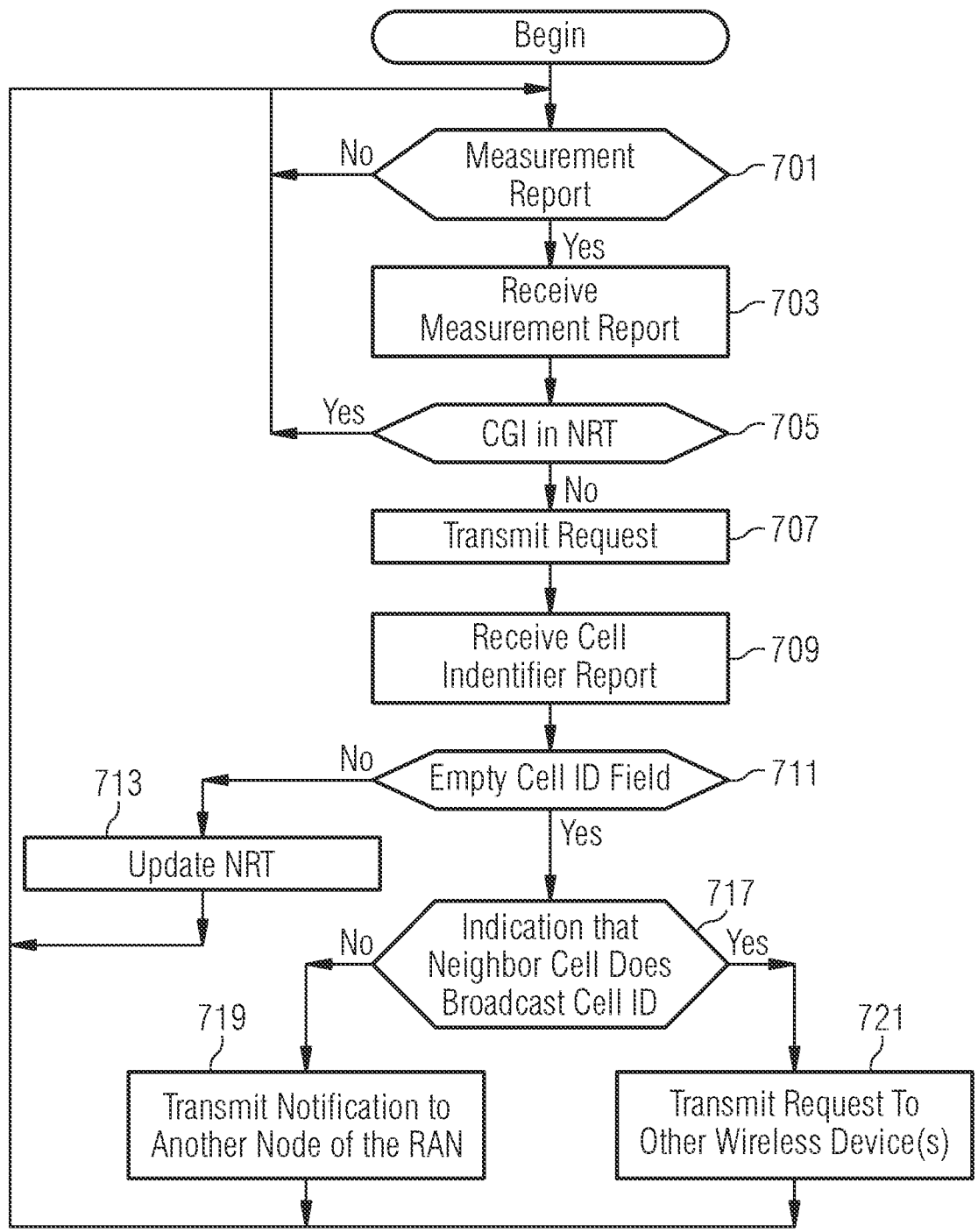
FIG. 7 is a flow chart illustrating operations of a base station according to some embodiments of inventive concepts.

FIG. 7 illustrates operations of a base station eNB/gNB of a radio access network RAN. At block 701, processor 5003 may determine if a measurement report has been transmitted by a UE. When a measurement report has been transmitted, processor 5003 may receive the measurement report from the wireless device through transceiver 5001 at block 703, with the measurement report including a physical cell identifier PCI for a neighbour cell. Provided that a cell global identifier CGI for the neighbour cell (corresponding to the PCI) is included in a neighbour relations table NRT for the base station, no further action regarding the NRT may be required.

Responsive to the CGI for the neighbour cell not being included in the NRT for the base station at block 705, however, processor 5003 may transmit a request through transceiver 5001 to the UE at block 707, with the request being a request to report a cell identifier of the neighbour cell (e.g., the CGI of the neighbour cell). Moreover, the request may include the PCI of the neighbour cell.

At block 709, processor 5003 may receive a cell identifier report from the wireless device. Responsive to the cell identifier report including an empty cell identifier information field and an indication that the neighbour cell does not broadcast the cell identifier of the neighbour cell at blocks 711 and 717, processor 5003 may transmit a notification through network interface 5007 to another node of the RAN at block 719.

Operations discussed above with respect to blocks 701, 703, 705, 707, 709, 711, 717, and 719 may thus be performed when a cell identifier report includes an empty cell ID field and an indication that the neighbour cell does not broadcast a cell identifier. Operations when a cell identifier report includes an empty cell ID field and an indication that the neighbour cell does broadcast a cell identifier are discussed below.

At block 701, processor 5003 may determine if a measurement report has been transmitted by a UE. When a measurement report has been transmitted, processor 5003 may receive the measurement report from the wireless device (e.g., the same or a different wireless device from the wireless device discussed above) through transceiver 5001 at block 703, with the measurement report including a physical cell identifier PCI for a second neighbour cell. Provided that a cell global identifier CGI for the second neighbour cell (corresponding to the PCI) is included in a neighbour relations table NRT for the base station, no further action regarding the NRT may be required.

Responsive to the CGI for the second neighbour cell not being included in the NRT for the base station at block 705, however, processor 5003 may transmit a request through transceiver 5001 to the UE at block 707, with the request being a request to report a cell identifier of the second neighbour cell (e.g., the CGI of the second neighbour cell). Moreover, the request may include the PCI of the second neighbour cell.

At block 709, processor 5003 may receive a cell identifier report from the wireless device. Responsive to the cell identifier report including an empty cell identifier information field and an indication that the second neighbour cell does broadcast the cell identifier of the second neighbour cell at blocks 711 and 717, processor 5003 may transmit a request through transceiver 5001 to another wireless device at block 721, with the request being a request for the other wireless device to report a cell identifier (CGI) of the second neighbour cell. The other wireless device may be able to receive the CGI of the second neighbour cell and provide a cell identifier report with the CGI for the second neighbour cell. Moreover, the request of block 721 may include the PCI of the second neighbour cell.

Operations discussed above with respect to blocks 701, 703, 705, 707, 709, 711, 717, and 721 may thus be performed when a cell identifier report includes an empty cell ID field and an indication that the second neighbour cell does broadcast a cell identifier. Operations when a cell identifier report includes a cell identifier (e.g., CGI) are discussed below.

At block 701, processor 5003 may determine if a measurement report has been transmitted by a UE. When a measurement report has been transmitted, processor 5003 may receive the measurement report from the wireless device (e.g., the same or a different wireless device from the wireless device/devices discussed above) through transceiver 5001 at block 703, with the measurement report including a physical cell identifier PCI for a third neighbour cell. Provided that a cell global identifier CGI for the third neighbour cell (corresponding to the PCI) is included in a neighbour relations table NRT for the base station, no further action regarding the NRT may be required.

Responsive to the CGI for the third neighbour cell not being included in the NRT for the base station at block 705, however, processor 5003 may transmit a request through transceiver 5001 to the UE at block 707, with the request being a request to report a cell identifier of the third neighbour cell (e.g., the CGI of the third neighbour cell). Moreover, the request may include the PCI of the third neighbour cell.

At block 709, processor 5003 may receive a cell identifier report from the wireless device. Responsive to the cell identifier report including the cell identifier of the third neighbour cell at block 711, processor 5003 may update the NRT for the base station using the cell identifier of the third neighbour cell. In addition to the cell identifier for the third neighbour cell (e.g., CGI), the cell identifier report for the third neighbour cell may provide a stand-alone/non-stand-alone indicator.

The same field (e.g., bit) of a cell identifier report may be used to indicate that a cell identifier is or is not broadcast when an empty cell identifier field is received in cell identifier reports of blocks 709, 711, and 717 or to indicate that a neighbour cell is stand-alone/non-stand-alone when a cell identifier is provided in cell identifier reports of blocks 709 and 711. According to some other embodiments, separate fields (e.g., separate bits) of a cell identifier report may be used to communicate indications that a cell identifier is or is not broadcast and to communicate stand-alone/non-stand-alone status of a neighbour cell.

Various operations from the flow chart of FIG. 7 may be optional with respect to some embodiments of base stations and related methods. Regarding methods of example embodiment 13 (set forth below), for example, operations of blocks 701, 703, 705, 713, 719, and 721 of FIG. 7 may be optional.

Further example embodiments of inventive concepts are set forth below.

1. A method of operating a wireless terminal (UE) in a radio access network, RAN, the method comprising:
   receiving (611, 613) system information from a neighbour cell, wherein the system information includes a first indication that the neighbour cell does not broadcast the cell identifier of the neighbour cell; and
   transmitting (615) a cell identifier report to the RAN, wherein the cell identifier report includes a second indication that the neighbour cell does not broadcast the cell identifier of the neighbour cell.
2. The method of claim 1, wherein the cell identifier is a cell global identifier, CGI, of the neighbour cell, the method further comprising:
   transmitting (603) a measurement report to the RAN, wherein the measurement report includes a physical cell identifier, PCI, for the neighbour cell; and
   receiving (607) a request from the RAN to report the cell identifier of the neighbour cell, wherein the request from the RAN includes the PCI for the neighbour cell.
3. The method of Embodiment 2, wherein the PCI is encoded in a synchronization signal transmitted by the neighbour cell.
4. The method of any of Embodiments 2-3 further comprising:
   initiating (609) a timer responsive to receiving the request;
   wherein transmitting the cell identifier report includes transmitting the cell identifier report to the RAN before expiration of the timer responsive to receiving the system information including the first indication that the neighbour cell does not broadcast the cell identifier of the neighbour cell.
5. The method of Embodiment 4, wherein the timer comprises a T321 timer.
6. The method of any of Embodiments 1-5, wherein the neighbour cell is a first neighbour cell, wherein the system information is first system information, and wherein the cell identifier report is a first cell identifier report, the method further comprising:
   receiving (607) a request from the RAN to report a cell identifier of a second neighbour cell;

initiating (609) a timer responsive to receiving the request;

receiving (611, 613, 617) second system information from the second neighbour cell responsive to receiving the second request, wherein the second system information includes a third indication that the second neighbour cell does broadcast the second cell identifier of the second neighbour cell; and transmitting (623) a second cell identifier report to the RAN responsive to the indication that the neighbour cell does broadcast the cell identifier of the second neighbour cell and responsive to expiration of the timer without receiving the cell identifier of the second neighbour cell, wherein the cell identifier report includes an empty cell identifier information field and a fourth indication that the second neighbour cell does broadcast the cell identifier of the second neighbour cell.

7. The method of Embodiment 6, wherein the timer comprises a T321 timer.

8. The method of any of Embodiments 1-7, wherein the second indication that the neighbour cell does not include a system information block is provided in a field of the cell identifier report used to provide a stand-alone/non-stand-alone indicator when the cell identifier information field is non-empty.

9. The method of any of Embodiments 1-5, wherein the second indication that the neighbour cell does not include a system information block is provided in a field of the cell identifier report used to provide a stand-alone/non-stand-alone indicator when the cell identifier information field is non-empty, wherein the neighbour cell is a first neighbour cell, wherein the system information is first system information, and wherein the cell identifier report is a first cell identifier report, the method further comprising:

receiving (607) a request from the RAN to report a cell identifier of a second neighbour cell;

receiving (611, 613, 617) system information from the neighbour cell responsive to receiving the request, wherein the system information includes a third indication that the neighbour cell does broadcast the cell identifier of the second neighbour cell and the cell identifier for the second neighbour cell; and transmitting (619) a cell identifier report to the RAN, wherein the second cell identifier report includes the cell identifier of the second neighbour cell and a stand-alone/non-stand-alone indicator for the second neighbour cell.

10. The method of any of Embodiments 1-9, wherein the cell identifier report is transmitted to a serving base station (eNB, gNB) of the RAN.

11. The method of any of Embodiments 1-10, wherein the system information comprises a master information block, MIB, including the indication that the neighbour cell does not include a system information block having the cell identifier of the neighbour cell in the system information.

12. The method of Embodiment 11, wherein the indication that the neighbour cell does not include a system information block having the cell identifier is provided in a physical downlink control channel, PDCCH, ConfigSIB1 information element, IE, of the MIB.

13. The method of any of Embodiments 1-12 further comprising:

receiving (607) a request from the RAN to report a cell identifier of a neighbour cell;

wherein receiving the system information comprises receiving the system information from the neighbour cell responsive to receiving the request.

14. The method of any of Embodiments 1-13, wherein transmitting the cell identifier report comprises transmitting the cell identifier report responsive to the first indication that the neighbour cell does not broadcast the cell identifier of the neighbour cell.

15. The method of any of Embodiments 1-14, wherein the cell identifier report includes an empty cell identifier information field and the second indication that the neighbour cell does not broadcast the cell identifier of the neighbour cell.

16. A method of operating a base station (eNB, gNB) of a radio access network, RAN, the method comprising:

receiving (709, 711, 717) a cell identifier report from a wireless device, wherein the cell identifier report includes an indication that the neighbour cell does not broadcast the cell identifier of the neighbour cell.

17. The method of Embodiment 16 further comprising:

transmitting (719) a notification to another node of the RAN responsive to the indication that the neighbour cell does not broadcast the cell identifier of the neighbour cell.

18. The method of any of Embodiments 16-17, wherein the wireless device is a first wireless device, wherein cell identifier report is a first cell identifier report, and wherein the neighbour cell is a first neighbour cell, the method further comprising:

transmitting (707) a request to a second wireless device, wherein the request is a request to report a second cell identifier of a second neighbour cell;

receiving (709, 711, 717) a second cell identifier report from the second wireless device, wherein the second cell identifier report includes a second empty cell identifier information field and an indication that the second neighbour cell does broadcast the second cell identifier of the second neighbour cell; and transmitting (721) a request to a third wireless device responsive to the second cell identifier report including the second empty cell identifier information field and responsive to the indication that the second neighbour cell does broadcast the second cell identifier of the second neighbour cell.

19. The method of any of Embodiments 16-18, wherein the cell identifier is a cell global identifier, CGI, of the neighbour cell, the method further comprising:

receiving (703) a measurement report from the wireless device, wherein the measurement report includes a physical cell identifier, PCI, for the neighbour cell;

transmitting (707) a request to the wireless device to report a cell identifier of a neighbour cell, wherein the request is transmitted responsive to receiving the measurement report and responsive to the CGI not being included in a neighbour relations table, NRT, for the base station, and wherein the request includes the PCI.

20. The method of any of Embodiments 16-19, wherein the indication that the neighbour cell does not include a system information block is provided in a field of the cell identifier report used to provide a stand-alone/non-stand-alone indicator when the cell identifier information field is non-empty.

21. The method of any of Embodiments 16-17, wherein the indication that the neighbour cell does not include a system information block is provided in a field of the cell identifier report used to provide a stand-alone/non-stand-alone indicator when the cell identifier information field is non-empty, the wireless device is a first wireless device, wherein cell identifier report is a first cell identifier report, and wherein the neighbour cell is a first neighbour cell, the method further comprising:

transmitting (707) a request to a second wireless device, wherein the request is a request to report a cell identifier of a second neighbour cell;

receiving (709, 711) a second cell identifier report from the second wireless device, wherein the second cell identifier report includes the cell identifier of the second neighbour cell and a stand-alone/non-stand-alone indicator for the second neighbour cell; and updating (713) a neighbour relations table, NRT, for the base station using the cell identifier of the second neighbour cell.

22. The method of any of Embodiments 16, 17, 18, 20, or 21 further comprising:

transmitting (707) a request to the wireless device (UE) wherein the request is a request to report a cell identifier of a neighbour cell.

23. The method of any of Embodiments 16-22, wherein the cell identifier report includes an empty cell identifier information field and the indication that the neighbour cell does not broadcast the cell identifier of the neighbour cell.

24. A first wireless device (UE) comprising:
a transceiver (4001) configured to provide wireless network communication with a wireless communication network; and
a processor (4003) coupled with the transceiver, wherein the processor is configured to provide wireless network communication through the transceiver, and wherein the processor is configured to perform operations according to any of Embodiments 1-15.

25. A wireless device (UE) being adapted to perform according to any of Embodiments 1-15.

26. A base station (eNB, gNB) of a wireless communication network, the base station comprising:
a transceiver (5001) configured to provide wireless network communication with a wireless terminal; and
a processor (5003) coupled with the transceiver, wherein the processor is configured to provide wireless network communications through the transceiver, and wherein the processor is configured to perform operations according to any of Embodiments 16-23.

27. A base station (eNB, gNB) of a radio access network, wherein the base station is adapted to perform according to any of Embodiments 16-23.

Figure 8:
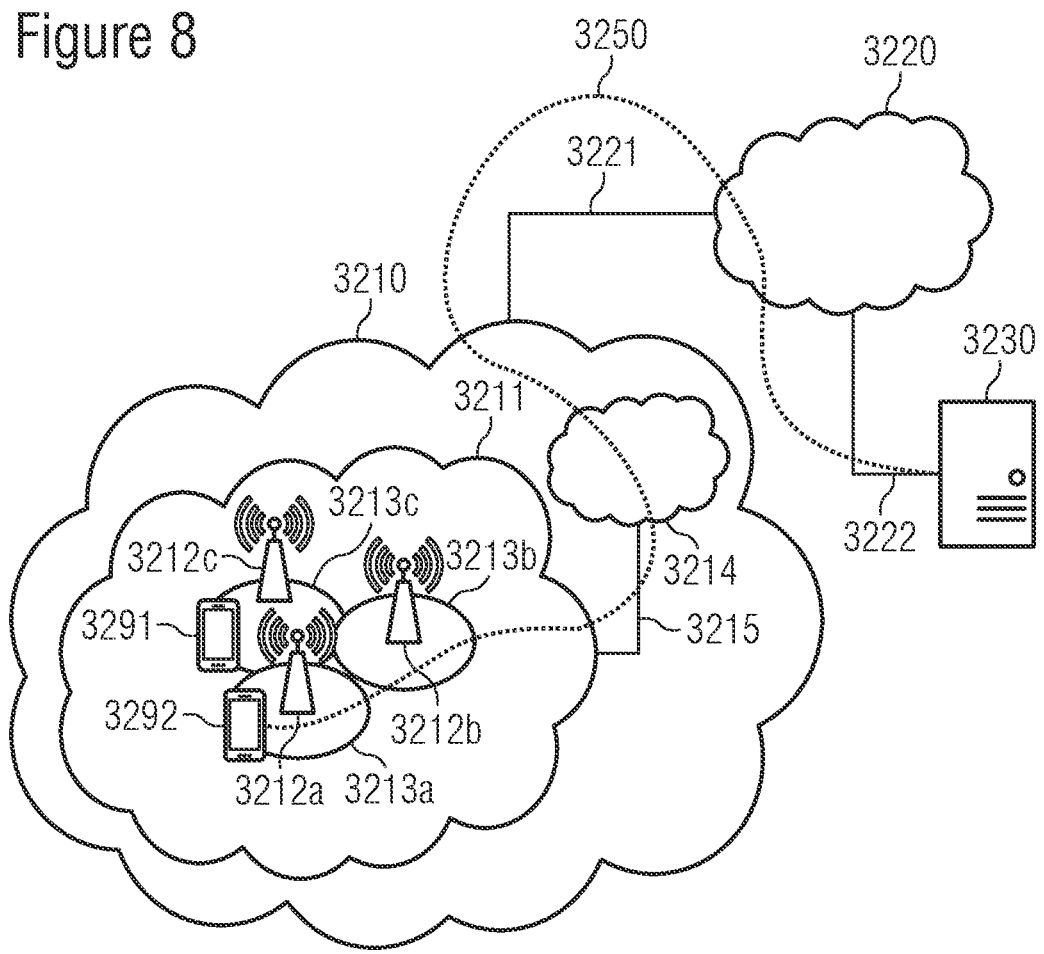
FIG. 8 schematically illustrates a telecommunication network connected via an intermediate network to a host computer.

FIG. 8 is a block diagram illustrating elements of a wireless device UE 3330 (also referred to as a wireless terminal, a wireless communication device, a wireless communication terminal, user equipment, UE, a user equipment node/terminal/device, etc.) configured to provide wireless communication according to embodiments of inventive concepts. As shown, wireless device UE may include an antenna 3336, and a transceiver circuit 3337 (also referred to as radio interface) including a transmitter and a receiver configured to provide uplink and downlink radio communications with a base station (gNB) of a wireless communication network (also referred to as a radio access network RAN). Wireless device UE may also include a processor circuit 3338 (also referred to as processing circuitry) coupled to the transceiver circuit, and a memory circuit 3335 (also referred to as memory) coupled to the processor circuit. The memory circuit 3335 may include computer readable program code that when executed by the processor circuit 3338 causes the processor circuit to perform operations according to embodiments disclosed herein. According to other embodiments, processor circuit 3338 may be defined to include memory so that a separate memory circuit is not required. Wireless device UE may also include an interface (such as a user interface) coupled with processor 3338, and/or wireless device UE may be an IoT and/or MTC device.

As discussed herein, operations of wireless device UE may be performed by processor 3338 and/or transceiver 3337. For example, processor 3338 may control transceiver 3337 to transmit uplink communications through transceiver 3337 over a radio interface to a base station of a wireless communication network (e.g., a gNB base station including a gNB-CU and one or more gNB-DUs) and/or to receive downlink communications through transceiver 3337 from a base station (e.g., a gNB base station including a gNB-CU and one or more gNB-DUs) of the wireless communication network over a radio interface. Moreover, modules may be stored in memory 3335, and these modules may provide instructions so that when instructions of a module are executed by processor 3338, processor 3338 performs respective operations (e.g., operations discussed below with respect to Example Embodiments).

The invention may be especially beneficial in a cloud implementation (or virtualized environment), where the physical placement of the network nodes may not be transparent or may be at least partially unknown. Moreover, the physical placement of DU's and CU's may vary and the number of intermediate nodes may vary as well. As a consequence of this, the UL and DL delay characteristics will also show significant variations depending on configuration and distances; it may be beneficial to continuously measure the delay contributions of the UL and DL.

With reference to FIG. 8, in accordance with an embodiment, a communication system includes a telecommunication network 3210, such as a 3GPP-type cellular network, which comprises an access network 3211, such as a radio access network, and a core network 3214.

The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The base station 3320 may comprise a CU 7000 and one or a plurality of DUs 6000. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
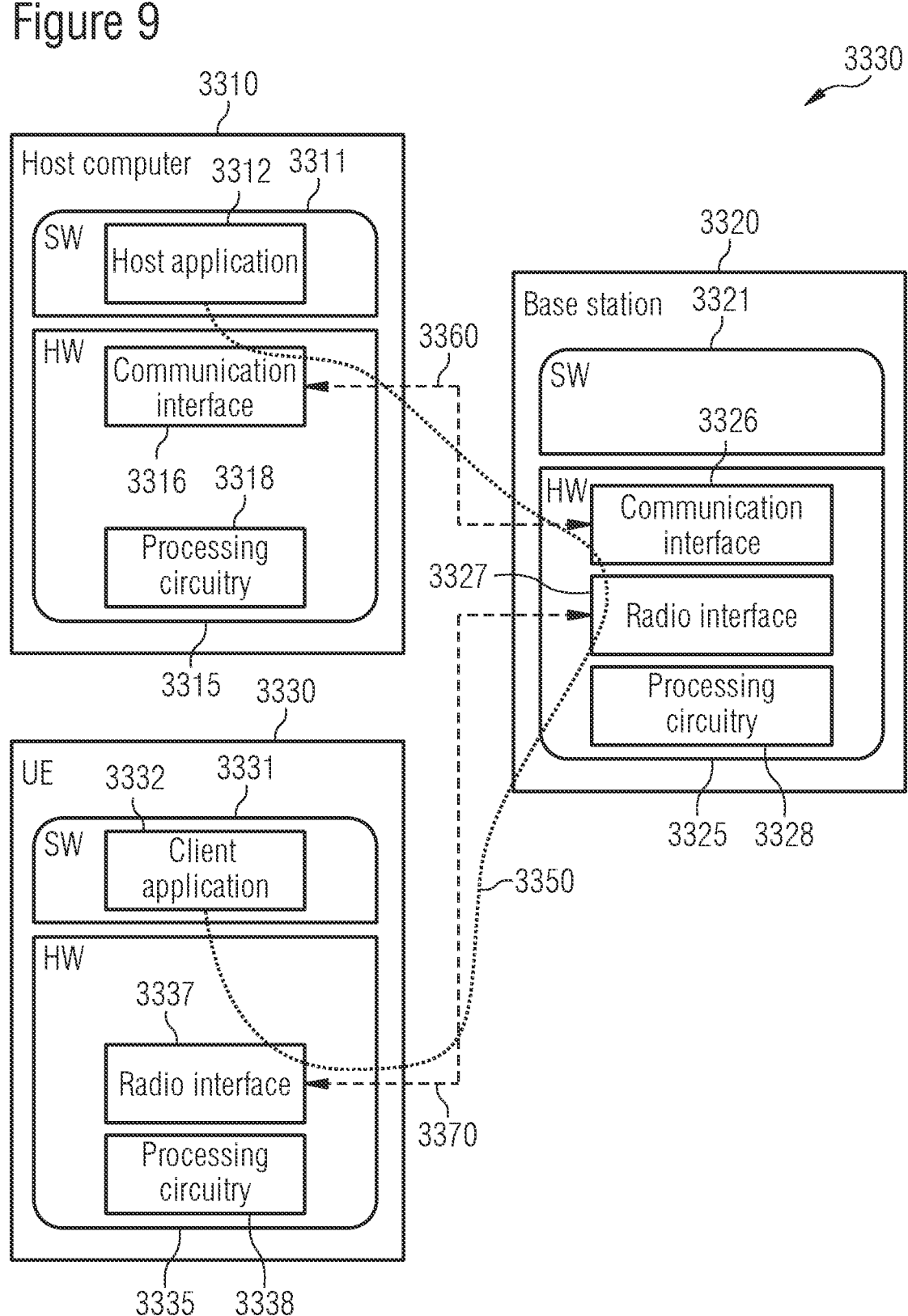
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency or power consumption and thereby provide benefits such as better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 10:
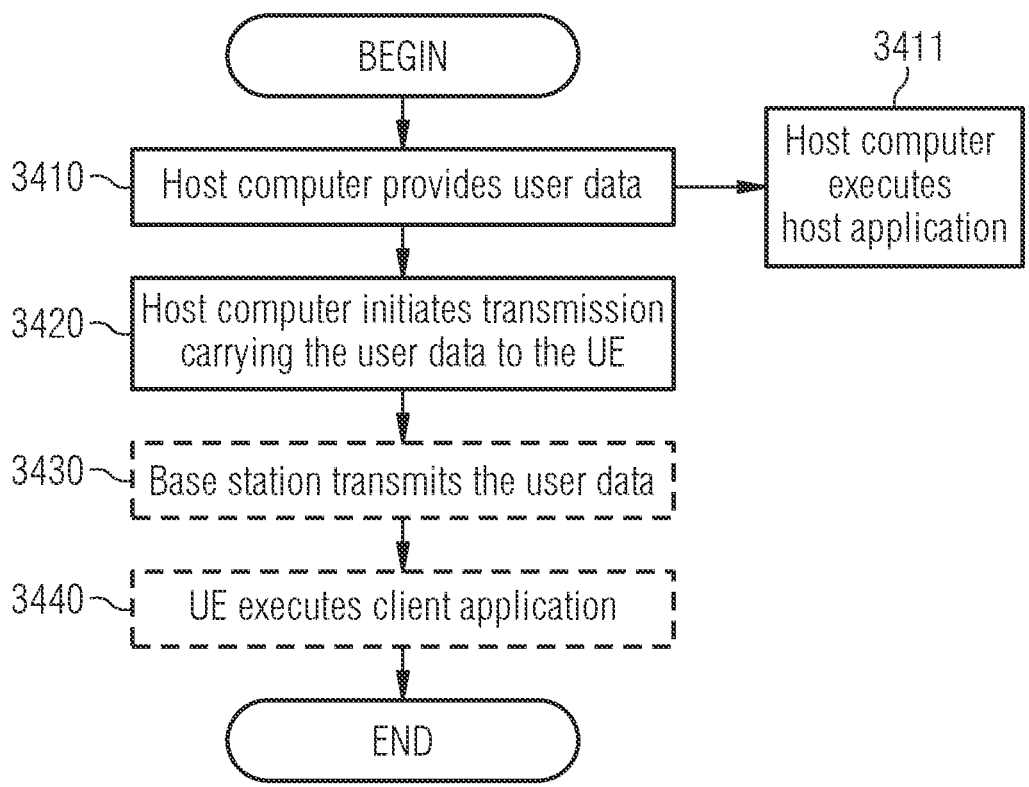
FIGS. 10 to 13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 11:
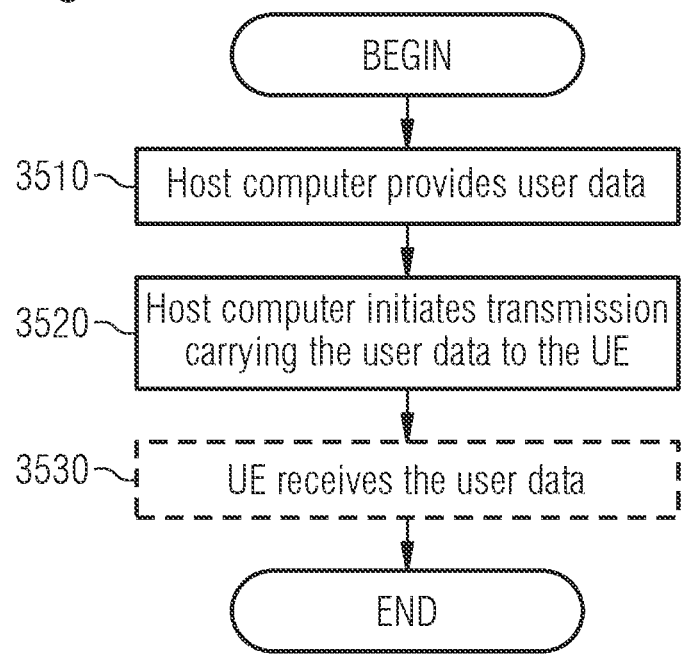

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 12:
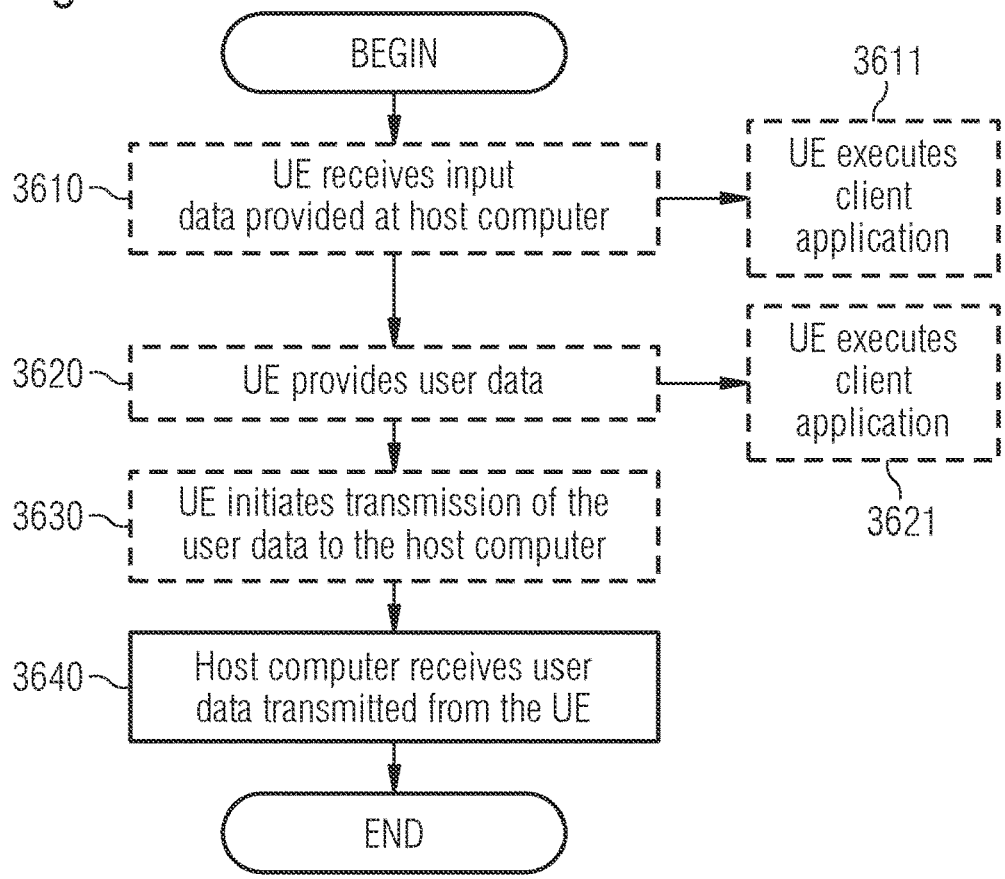

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 13:
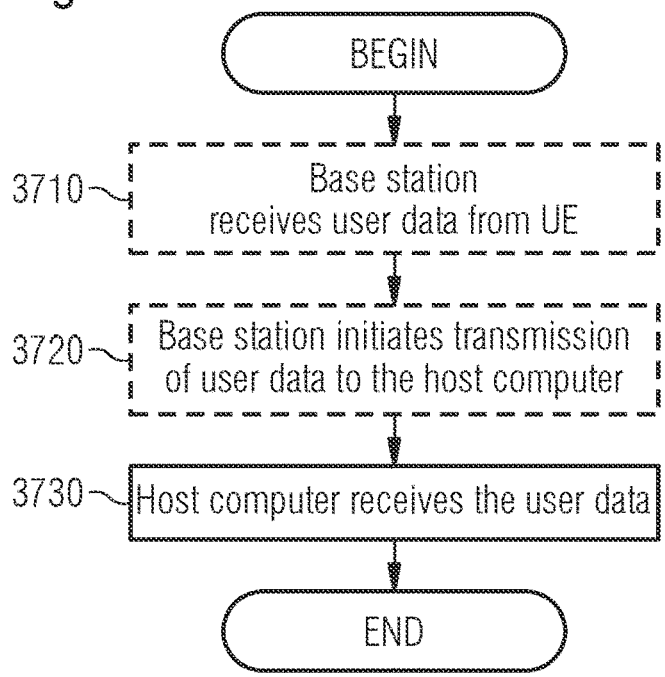

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The invention claimed is:

1. A method of operating a wireless terminal, UE, connected to a network node associated to a serving cell of a radio access network, RAN, the method comprising:
   receiving a request from the network node to report a cell global identifier, CGI, of a neighbor cell of the serving cell;
   starting a timer responsive to receiving the request to report the CGI;
   receiving system information from a neighbor cell;
   determining from the system information if the neighbor cell does or does not broadcast the CGI of the neighbor cell;
   transmitting a CGI report to the network node;
   wherein if the neighbor cell does not broadcast the CGI, including into the CGI report an indication that the neighbor cell does not broadcast the CGI of the neighbor cell; and
   transmitting the CGI report before expiration of the timer; and
   wherein the CGI report includes a cell identifier information field, wherein an empty field indicates that either the neighbor cell does not broadcast the CGI of the neighbor cell, or that the UE did not properly detect the broadcasted CGI.

2. The method of claim 1, further comprising stopping the timer upon transmitting the CGI report.

3. The method of claim 1, further comprising:
   transmitting a measurement report to the network node, wherein the measurement report includes a physical cell identifier, PCI, for the neighbor cell; receiving (607) a request from the network node to report the CGI of the neighbor cell, wherein the request includes the PCI for the neighbor cell.

4. The method of claim 3, wherein the determining from the system information, if the neighbor cell does not broadcast a cell global identifier, CGI is based on the PCI.

5. The method of claim 3, wherein the PCI is encoded in a synchronization signal transmitted by the neighbor cell.

6. The method of claim 1, wherein the timer is a T321 timer, and wherein if the UE succeeds within the duration of the timer to determine the CGI, information about the CGI is included in the CGI report.

7. The method of claim 1, wherein the system information is comprised in a master information block, MIB, including the indication that the neighbor cell does not include a system information block having the cell identifier of the neighbor cell in the system information.

8. The method of claim 7, wherein the indication that the neighbor cell does not include a system information block having the cell identifier is provided in a physical downlink control channel, PDCCH, ConfigSIB1 information element, IE, of the MIB.

9. The method of claim 1, wherein the CGI report further comprises a flag indicative of a presence of system information, wherein the flag indicates that either the neighbor cell does not broadcast the CGI of the neighbor cell, or that the UE did not properly detect the broadcasted CGI.

10. A method of operating a network node of a radio access network, RAN, wherein the network node is associated to a serving cell serving a wireless device, UE the method comprising:
   transmitting a request to the UE to report a cell global identifier, CGI, of a neighbor cell;
   receiving a CGI report from the UE, wherein the CGI report does not comprise the CGI of the neighbor cell;
   determining from an indication in the CGI report, if the CGI was not broadcasted by the neighbor cell, or if the UE was not being able to detect the CGI broadcasted by the neighbor cell; and
   taking an action in dependency of the determining; and
   wherein the CGI report includes a cell identifier information field wherein an empty field indicates that either the neighbor cell does not broadcast the CGI of the neighbor cell, or that the UE did not properly detect the broadcasted CGI.

11. The method of claim 10 further comprising:
   transmitting a notification to another node of the RAN node responsive to the detection that the neighbor cell does not broadcast the cell identifier of the neighbor cell.

12. The method of claim 10, further comprising: instructing a second UE to perform a CGI reporting for the neighbor cell, if it is determined that the UE was not able to detect the broadcasted CGI of the neighbor cell.

13. The method of claim 10, further comprising:
   receiving a measurement report from the UE, wherein the measurement report includes a physical cell identifier, PCI, for the neighbor cell.

14. The method of claim 13, wherein the request is transmitted responsive to receiving the measurement report and responsive to detecting that the CGI is not being included in a neighbor relations table, NRT, for the network node, and wherein the request includes the PCI.

15. The method of claim 10, wherein the indication is provided in a field of the cell identifier report used to provide a stand-alone/non-stand-alone indicator when the cell identifier information field is non-empty.

16. The method of claim 10, wherein the CGI report further comprises a flag indicative of a presence of system information, wherein the flag indicates that either the neighbor cell does not broadcast the CGI of the neighbor cell, or that the UE did not properly detect the broadcasted CGI.

17. A wireless device, UE comprising:
   a transceiver configured to provide wireless network communication with a wireless communication network; and
   a processor coupled with the transceiver, wherein the processor is configured to provide wireless network communication through the transceiver, and wherein the processor is configured to,
   receive a request from a network node to report a cell global identifier, CGI, of a neighbor cell of a serving cell of a radio access network node, RAN, wherein the network node is associated to the serving cell,
   start a timer responsive to receiving the request to report the CGI,
   receive system information from a neighbor cell,
   determine from the system information if the neighbor cell does or does not broadcast the CGI of the neighbor cell,
   transmit a CGI report to the network node,
   wherein if the neighbor cell does not broadcast the CGI, include into the CGI report an indication that the neighbor cell does not broadcast the CGI of the neighbor cell; and
   transmit the CGI report before expiration of the timer; and
   wherein the CGI report includes a cell identifier information field, wherein an empty field indicates that either the neighbor cell does not broadcast the CGI of the neighbor cell, or that the UE did not properly detect the broadcasted CGI.

18. A network node of a radio access network, RAN, wherein the network node is associated to a serving cell serving a wireless device, UE, the network node comprising:
   a transceiver configured to provide wireless network communication with a wireless terminal; and
   a processor coupled with the transceiver, wherein the processor is configured to provide wireless network communications through the transceiver, and wherein the processor is configured to,
   transmit a request to the UE to report a cell global identifier, CGI, of a neighbor cell,
   receive a CGI report from the UE, wherein the CGI report does not comprise the CGI of the neighbor cell,
   determine from an indication in the CGI report, if the CGI was not broadcasted by the neighbor cell, or if the UE was not being able to detect the CGI broadcasted by the neighbor cell, and
   take an action in dependency of the determining; and
   wherein the CGI report includes a cell identifier information field wherein an empty field indicates that either the neighbor cell does not broadcast the CGI of the neighbor cell, or that the UE did not properly detect the broadcasted CGI.

* * * * *

UNITED STATES PATENT AND TRADEMARK OFFICE
CERTIFICATE OF CORRECTION

| | | |
|---|---|---|
| PATENT NO. | : 11,368,883 B2 | |
| APPLICATION NO. | : 17/048064 | |
| DATED | : June 21, 2022 | |
| INVENTOR(S) | : Moosavi et al. | |

It is certified that error appears in the above-identified patent and that said Letters Patent is hereby corrected as shown below:

In the Specification

In Column 1, Line 32, delete "(PC)." and insert -- (PCI). --, therefor.

In Column 1, Lines 43-44, delete "cell reference signal (CRS)" and insert -- cell-specific reference signal (CRS) --, therefor.

In Column 1, Line 62, delete "ECG/CGI" and insert -- ECGI/CGI --, therefor.

In Column 3, Line 60, delete "a part" and insert -- are part --, therefor.

In Column 8, Lines 16-18, delete "According to some embodiments, the NCGI measurement......not." and insert the same at Line 15, after "network." as a continuation paragraph.

In Column 8, Line 17, delete "be indicate of" and insert -- indicate --, therefor.

In Column 8, Line 21, delete "(e.g." and insert -- e.g. --, therefor.

In Column 9, Line 40, delete "neighbour cell," and insert -- neighbour cell; --, therefor.

In Column 12, Lines 17-21, delete "According to some other embodiments, separate fields.......status." and insert the same at Line 16, after "619." as a continuation paragraph.

In Column 13, Line 32, delete "cell identifier (CGI)" and insert -- cell global identifier (CGI) --, therefor.

In Column 20, Line 43, delete "use" and insert -- user --, therefor.

Signed and Sealed this
Fourteenth Day of February, 2023

Katherine Kelly Vidal
*Director of the United States Patent and Trademark Office*

CERTIFICATE OF CORRECTION (continued)
U.S. Pat. No. 11,368,883 B2

In the Claims

In Column 23, Line 14, in Claim 8, delete "a system information block" and insert -- the system information block --, therefor.

In Column 23, Line 47, in Claim 12, delete "a CGI reporting" and insert -- the CGI reporting --, therefor.

In Column 24, Line 17, in Claim 17, delete "radio access network node, RAN," and insert -- radio access network, RAN, --, therefor.